March 1, 1927.

S. A. JEFFRIES 1,619,127

TRANSMISSION

Filed Dec. 22, 1924    2 Sheets-Sheet 1

INVENTOR.
Schuyler A. Jeffries
By Whittemore, Hulbert,
Whittemore & Belknap
ATTORNEYS March 1, 1927.
S. A. JEFFRIES
1,619,127
TRANSMISSION
Filed Dec. 22, 1924
2 Sheets-Sheet 2
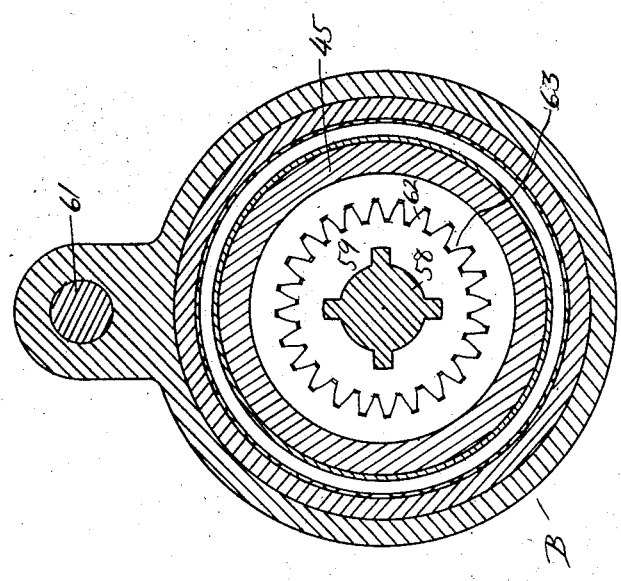
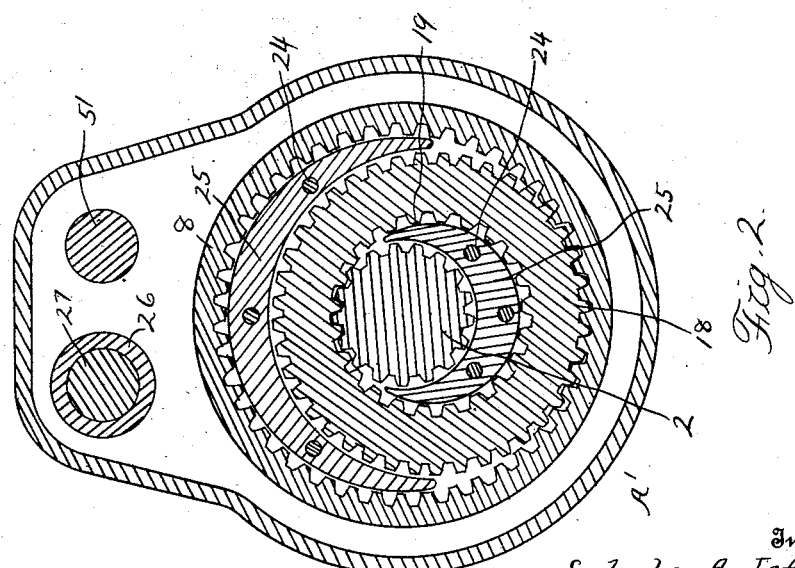
Inventor
Schuyler A. Jeffries
By Whittemore Hulbert Whittemore
Belknap
Attorneys Patented Mar. 1, 1927.

1,619,127

UNITED STATES PATENT OFFICE.

SCHUYLER A. JEFFRIES, OF LANSING, MICHIGAN, ASSIGNOR TO REO MOTOR CAR COMPANY, OF LANSING, MICHIGAN, A CORPORATION OF MICHIGAN.

TRANSMISSION.

Application filed December 22, 1924. Serial No. 757,518.

The invention relates to transmission mechanisms adapted for use in motor vehicles.

One of the objects of the invention is to provide a transmission with two units in axial alignment, each unit comprising a pair of concentric gears, an eccentric gear and a rotatable eccentric for mounting the latter. Another object is to provide one of the units of the transmission with means for alternatively coupling the eccentric and the eccentric gear in certain predetermined relationship with the driven shaft and the transmission casing so as to obtain a direct drive, a forward speed at reduced ratio and a reverse speed at reduced ratio. Another object of the invention is to provide an arrangement having four forward speeds and two reversing speeds.

Other objects reside in the more specific details of construction and arrangement of parts as more fully hereinafter described.

In the drawings:—

Figure 2 is a transverse section on the line 2—2 of Figure 1; and

Figure 3 is a transverse section on the line 3—3 of Figure 1.

Figure 1:
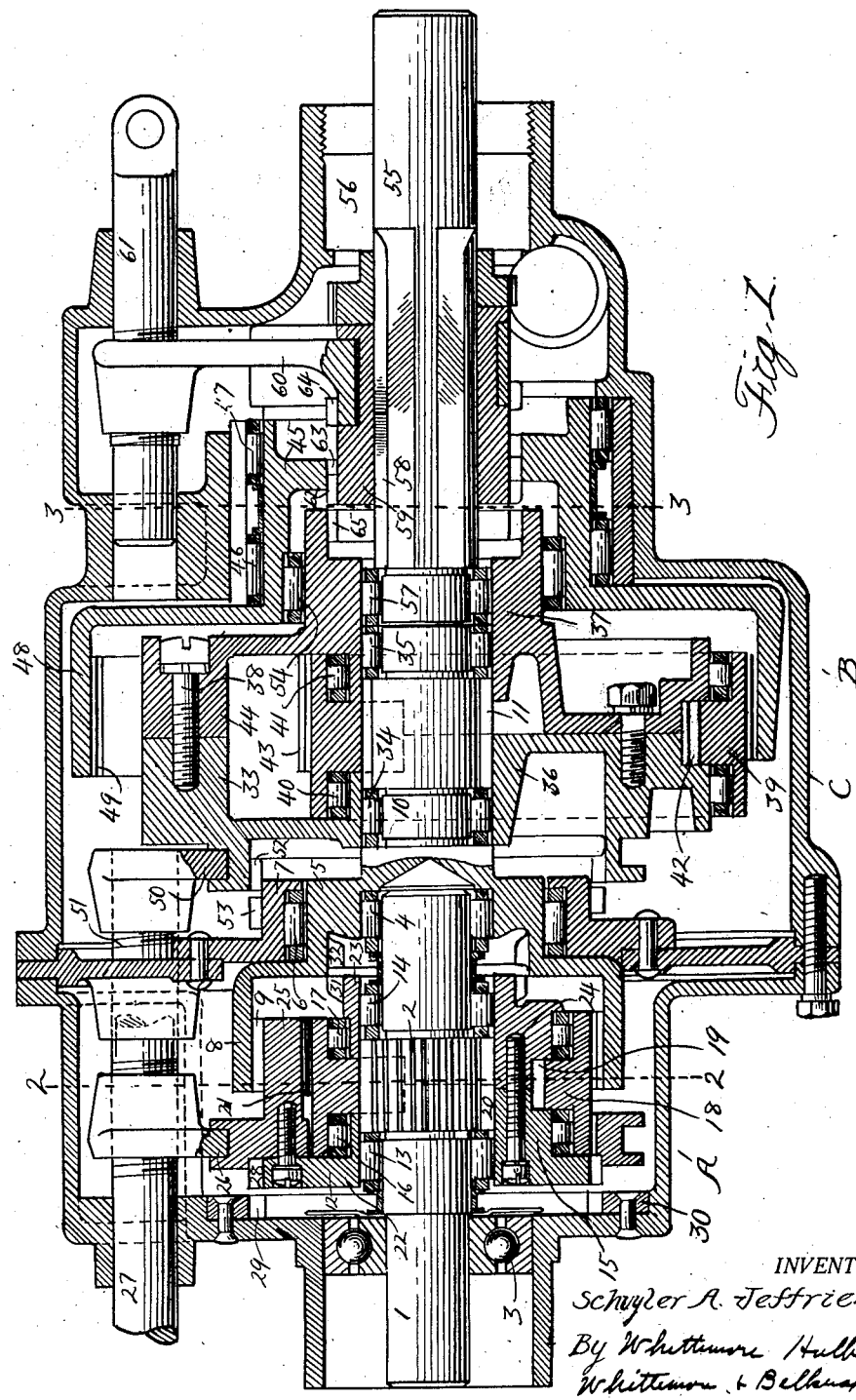
Figure 1 is a longitudinal section through the transmission.

The transmission comprises two units A and B in axial alignment with each other and housed together in a common transmission casing C, the latter being preferably formed of a plurality of complementary parts to facilitate the assembly of the parts therewithin.

The unit A comprises a drive shaft 1 having a pinion 2 thereon, said shaft being supported by the ball bearings 3 at the forward end of the transmission casing and being journaled at its other end upon roller bearings 4 within the rotatable member 5. This latter member is also journaled in the transmission casing by means of roller bearings 6, there being an inwardly projecting flange 7 supported by the casing for receiving these bearings. The member 5 has at its forward end the annular flange 8 provided with internal gear teeth 9 and at the opposite end of said member there is a shaft 10 having external teeth 11 thereon. 12 is an eccentric rotatably supported on the driving shaft 1 by the roller bearings 13 and 14 arranged on opposite sides of the driving pinion 2, this eccentric being provided with the eccentric hub portion 15 carrying roller bearings 16 and 17 for rotatably supporting the eccentric gear 18. The gear 18 has internal gear teeth 19 meshing with the teeth 20 of the pinion 2 and has the external gear teeth 21 meshing with internal gear teeth 9 of rotatable member 5. Eccentric 12 is preferably made of two complementary parts 22 and 23 secured together by suitable means such as the bolts 24 and there is also provided a counterweight 25 arranged diametrically opposite to the eccentric hub in order that the eccentric may be balanced during the rotation thereof. The eccentric is also longitudinally slidable upon the roller bearings 13 and 14, this being accomplished by means of the shifting fork 26 which projects into engagement with the eccentric and is itself mounted upon a shifting rod 27. In the forward position of the rod 27 and shifting fork 26 the eccentric is clutched to the transmission casing by means of the external clutch teeth 28 engaging internal clutch teeth 29, the latter being formed on a ring 30 fixed to the transmission casing. In the rear position of the eccentric 12 it is clutched to the revoluble member 5 by reason of the engagement of clutch teeth 31 on the eccentric with corresponding clutch teeth 32 on the member 5.

The unit B is similar in construction to the unit A and is provided with an eccentric 33 rotatably supported on the shaft 10 by the roller bearings 34 and 35 on opposite sides of the gear 11. This eccentric is also preferably formed of two complementary portions 36 and 37 secured together by bolts 38. 39 is an eccentric gear rotatably journaled upon the eccentric 33 by means of roller bearings 40 and 41 and having internal gear teeth 42 meshing with the teeth 11 and external gear teeth 43. The eccentric is provided with a counterweight portion 44 arranged diametrically opposite to the eccentric bearing in order to balance the eccentric in its rotative movement.

45 is a rotatable sleeve journaled in bearings 46 and 47 in the rear portion of the transmission casing and having the forwardly extending annular flange 48 surrounding the eccentric 33 and being provided with internal gear teeth 49 meshing with external teeth 43 of the eccentric gear 39. The eccentric 33 is longitudinally slidable upon its bearings 34 and 35 by means of a shifting fork 50, the latter being mounted on the shifting rod 51 arranged parallel to the first-mentioned shifting rod 27. In the forward position of the eccentric it is clutched to the transmission casing by means of the internal clutch teeth 52 on the eccentric engaging the external clutch teeth 53 formed on the flange 7. It will be noted that the eccentric 33 is also journaled within the rotatable member 45 by the roller bearings 54.

55 is a driven shaft journaled at its rear end in the bearings 56 in the transmission casing and at its forward end in roller bearings 57 within the eccentric 33. The driven shaft is provided with splines 58 on which is slidably mounted a clutch sleeve 59 adapted to be moved by a shifting fork 60 projecting in from the reverse control rod 61. The clutch sleeve has external clutch teeth 62 thereon adapted in its rear position to mesh with internal clutch teeth 63 on the rotatable member 45. There are also the clutch teeth 64 arranged on the shifting fork 60 adapted to mesh with the clutch teeth 63 in the forward position of the shifting fork. Clutch teeth 65 on the eccentric 33 are adapted to engage the clutch teeth 62 of the clutch sleeve 59 when the latter is in its forward position and the eccentric is in its rear position.

The speeds obtainable with the transmission as above described are as follows: The direct drive is obtained with all of the control rods in the rear position. Therefore, the eccentric 12 is clutched to the revoluble member 5 by the engagement of clutch teeth 31 and 32. The eccentric 33 is clutched to the driven shaft 55 by the engagement of clutch teeth 62 and 65, the teeth 62 at the same time engaging the teeth 63 and thus clutching the member 45, 48 also to the driven shaft. Therefore, all of the parts rotate as a unit.

The second speed is obtained by moving control rod 27 forward thereby clutching the eccentric 12 to the transmission case through the engagement of clutch teeth 28 and 29. This causes the drive to be through the eccentric gear 18 to the rotatable member 5. The third speed is obtained by having control rod 27 in its rear position and moving control rod 51 to its forward position, thus clutching eccentric 33 to the transmission case by reason of the engagement of clutch teeth 52 and 53. The drive now passes through the eccentric gear 39 to the rotatable member 45 and from thence to the driven shaft 55 by reason of engagement of clutch teeth 62 and 63. The fourth speed is obtained by having control rods 27 and 51 both in the forward position thereby locking both eccentrics 12 and 33 to the transmission case and causing the drive to pass through both eccentric gears 18 and 39.

The reverse speeds are obtained by shifting control rod 61 to its forward position, this preventing rotation of the member 45 by reason of the engagement of the fixed clutch teeth 64 with clutch teeth 63. At the same time the clutch sleeve 59 is directly connected to eccentric 33 by the engagement of clutch teeth 62 and 65. The control rod 51 must also be in its rear position so that the eccentric 33 is free to revolve at the same speed as the driven shaft 55. With the control rod 27 in the rear position a reverse speed is obtained depending upon the ratios of the gears in unit B, while with the control rod 27 in its forward position, the ratio is a combination of the reduction obtained by units A and B. In both cases, however, the eccentric 33 is compelled to rotate reversely to the driving member 5 because the rotatable member 45 is held fixed.

What I claim as my invention is:—

1. In a transmission, the combination of a pair of concentric gears, a driving shaft for one of said gears, an eccentric, an eccentric gear journaled on said eccentric having internal gear teeth meshing with one of said concentric gears, and having external gear teeth meshing with the other, a driven shaft, and means for fixing one of said concentric gears against rotation and connecting said eccentric to said driven shaft whereby the latter is driven reversely to the first-mentioned gear.

2. In a transmission, the combination with a driving shaft and a driven shaft, of a pair of concentric gears, one being secured to said driving shaft, an eccentric, an eccentric gear journaled on said eccentric having internal gear teeth meshing with one of said concentric gears and having external gear teeth meshing with the other, means for clutching said eccentric to one of said concentric gears, means for clutching one of said concentric gears to said driven shaft and means for fixing one of said concentric gears against rotation and simultaneously clutching said eccentric to said driven shaft.

3. In a transmission, the combination of a pair of concentric gears, a rotatable eccentric, an eccentric gear journaled on said eccentric and having internal and external gear teeth meshing with said concentric gears, a driven shaft, means for fixing one of said concentric gears against rotation and simultaneously connecting said eccentric to said driven shaft, a second pair of concentric gears axially aligned with said first pair, one of said second pair of gears being connected to one of said first pair, a second eccentric, a second eccentric gear having internal and external gear teeth meshing with the gears of said second pair, and means for alternatively fixing said second eccentric against rotation and clutching the same to one of said second pair of concentric gears.

4. In a transmission, the combination of a pair of concentric gears, a rotatable eccentric, an eccentric gear journaled on said eccentric and having internal and external gear teeth meshing with said concentric gears, a driven shaft, means for clutching said eccentric to one of said concentric gears, means for clutching one of said concentric gears to said driven shaft, means for fixing one of said concentric gears against rotation and simultaneously clutching said eccentric to said driven shaft, a second pair of concentric gears axially aligned with said first pair, one of said second pair of gears being connected to one of said first pair, a second rotatable eccentric, a second eccentric gear having internal and external gear teeth meshing with the gears of said second pair, and means for alternatively clutching said eccentric to one of said second pair of concentric gears, of fixing the same against rotation.

5. In a transmission, the combination with a transmission case, two pairs of concentric gears in axial alignment, two eccentric gears each having internal and external gear teeth meshing with the gears in one of said pairs, a rotatable eccentric for mounting each of said eccentric gears, means for alternatively clutching one of said eccentrics to prevent rotation thereof or to clutch the same to a concentric gear, means for alternatively clutching the other of said eccentrics to a concentric gear or to said transmission case, and means for holding one of said concentric gears from rotation and simultaneously clutching said eccentric to another of said concentric gears.

6. In a transmission the combination with driving and driven shafts, of a revoluble member journaled concentric with said shafts, a gear journaled eccentrically on said revoluble member having internal and external gear teeth, a pinion on said drive shaft engaging the internal teeth of said eccentric gear, a gear concentric with said driven shaft engaging the external teeth of said eccentric gear, and means for selectively coupling said gears and shafts in a plurality of alternative arrangements, the first being obtained by preventing rotation of said revoluble member, the second being obtained by preventing rotation of said concentric gear and simultaneously clutching said revoluble member to said driven shaft and the third being obtained by clutching said driven shaft to both said revoluble member and said concentric member.

7. A transmission comprising a transmission housing, driving and driven shafts axially aligned within said housing, a revoluble member also axially aligned with said shafts and having internal and external gear teeth thereon, a driving pinion secured to said driving shaft, an eccentric journaled on said driving shaft, an eccentric gear journaled on said eccentric and meshing with said driving pinion and said internal gear, a second eccentric journaled upon said revoluble member, a second eccentric gear journaled upon said second eccentric and meshing with the external teeth on said revoluble member, a concentric gear meshing with said second eccentric gear, a longitudinally slidable sleeve in driving engagement with said driven shaft, clutch teeth on said sleeve alternatively engageable with said second eccentric and said concentric gear, a fork for actuating said sleeve, clutch teeth on said fork engageable with said concentric gear and separate means for shifting each of said eccentrics longitudinally to alternatively prevent rotation thereof or to compel rotation corresponding to one of said rotating members.

8. A transmission comprising a transmission case, a drive shaft, a revoluble member and a driven shaft all in axial alignment within said case, eccentrics journaled respectively on said driving shaft and said revoluble member, eccentric gears journaled on each of said eccentrics, a pinion on said driving shaft meshing with one of said eccentric gears, a gear on said revoluble member also meshing with said eccentric gear, a gear on said revoluble member meshing with the second of said eccentric gears, a concentric gear meshing also with said second eccentric gear, means for selectively shifting said eccentrics longitudinally within said casing, a clutch sleeve slidable on said driven shaft, and means for shifting said clutch sleeve to connect said concentric gear to said driven shaft, and means for preventing rotation of said concentric gear and simultaneously clutching said second eccentric to said driven shaft.

9. In a transmission, the combination with a pair of co-axial gears, of an eccentric rotatable co-axially with said gears, an eccentric gear journaled upon said eccentric and meshing with both of said co-axial gears, said eccentric being slidable in common with said eccentric gear in the direction of its axis of rotation, and means engageable by said eccentric in one limiting position of its sliding travel restraining said eccentric from rotation.

In testimony whereof I affix my signature.

SCHUYLER A. JEFFRIES.